Oct. 22, 1940.   P. P. EAGLE   2,219,178
FIRE EXTINGUISHER
Filed June 14, 1939
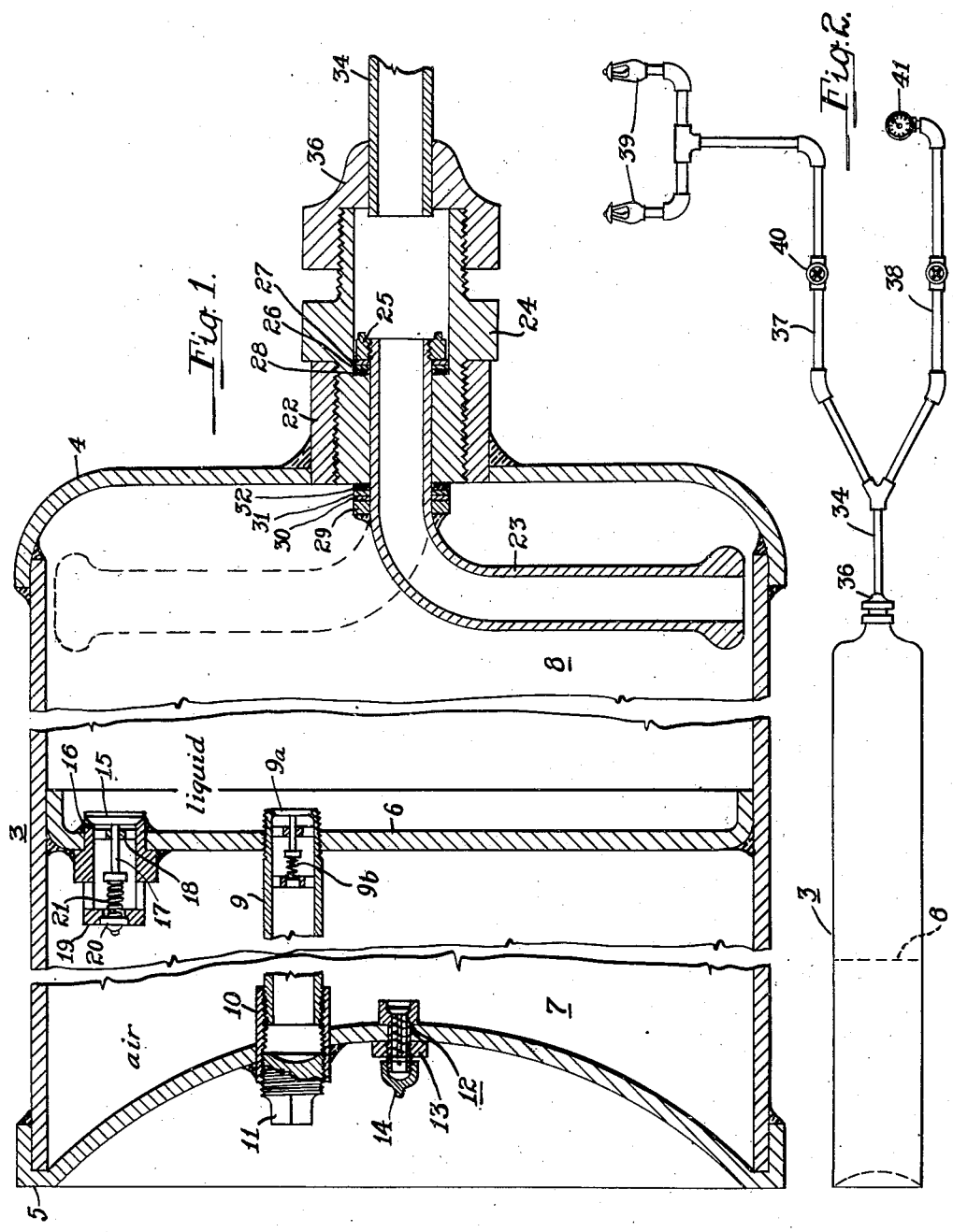

Patented Oct. 22, 1940

2,219,178

UNITED STATES PATENT OFFICE 2,219,178

FIRE EXTINGUISHER

Percy P. Eagle, Ronceverte, W. Va.

Application June 14, 1939, Serial No. 279,109

4 Claims. (Cl. 221—74)

This invention relates to fire extinguishing apparatus, certain features whereof render the device particularly suitable for use in motor vehicles, aircraft, etc., the apparatus, however, being useful for extinguishing small fires wherever they may occur.

The apparatus is of the type wherein a body of compressed air is provided for ejecting a fire-extinguishing liquid such as carbon tetrachloride, and has for one of its objects the provision of means whereby the discharge pipe or conduit for the liquid will automatically swing toward the lowest point in the liquid chamber upon turning movements of the chamber, and the pipe will be in position to receive the liquid from the low point in the chamber.

Another object of my invention is to provide means whereby the body of compressed air, which serves as the motive power for ejecting the liquid, will be kept sealed off from the liquid chamber when the apparatus is not actually being employed in the extinguishing of a fire, and wherein the air pressure will automatically be applied to the liquid upon opening of a discharge line from the liquid chamber.

One form which my invention may take is shown in the accompanying drawing wherein Figure 1 is a broken sectional view, on an enlarged scale, of the tank portion of the apparatus and the parts immediately associated therewith, and Fig. 2 is a view showing the extinguishing apparatus in completely assembled condition.

The apparatus comprises a metal tank 3 having end walls 4 and 5 welded or otherwise suitably secured to the body portion thereof. Partition plate 6 divides the tank 3 into an air chamber 7 and a liquid chamber 8. The liquid chamber will be filled with a fire-extinguishing liquid such as carbon tetrachloride, and the chamber 7 will be filled with air under pressure sufficient to effect the proper discharge of the extinguishing liquid. The liquid chamber may conveniently be of 50% greater cubical dimension than the air chamber.

The liquid is introduced into the chamber 8 through a filling pipe 9 and its associated coupling member 10 that extend through the end wall 5 and the partition 6, and are closed by a screw plug 11. Compressed air is introduced into the chamber 7 past an air inlet valve 12 such as those employed on automobile tires, the valve being held in place by a nut 13 and having a dust cap 14. A check valve 9a prevents back flow through the pipe 9 and is yieldably held closed by a tension spring 9b. The end wall 5 is dished inwardly so that the plug 11 and the valve 12 will not project beyond the endmost plane of the tank.

Communication is effected between the chambers 7 and 8 past a valve 15 that cooperates with a valve seating member 16 which extends through the partition 6. The valve has a stem 17 that is guided by a spider or cross bar 18 which forms part of the member 16. The valve member 16 has an extension 19 open at its sides and supporting a washer or collar 20 to one end of which is anchored a torsional spring 21, the other end of the spring being connected to the rear end of the valve stem 17. The spring will thus yieldably hold the valve 15 against its seat, and will thereby prevent intermingling of the air and the liquid such as would occur through churning movements of the tank, particularly if the apparatus is mounted on aircraft or a motor vehicle.

This constitutes an important feature of my invention in that if the partition 6 were omitted and the tank 3 simply filled partly with liquid and partly with compressed air, the intermingling of the air and the liquid would be undesirable for a number of reasons. In the first place, the liquid would not be so effectively discharged and the intermingled air globules would burst at the discharge nozzle, scattering the liquid too greatly and permitting access of atmospheric air to the area being sprayed, and furthermore, the oxygen in the bursting globules of air would be undesirable in the zone of fire.

A discharge pipe 23 of angular form is pivotally supported in the end wall 4 of the tank. This pipe is supported by a coupling member 24 that has threaded engagement with an extension sleeve 22 which is welded to the end wall 4. The pipe 23 is held in the coupling 24 by a screw threaded clamping collar or nut 25 that has threaded engagement with the pipe 23 and is provided with projecting studs for engagement with a wrench by means of which the coupling is rotated on the pipe. The nut 25 seats against packing members consisting of washers 26 and 27 of bronze or other metal and a felt washer 28. The pipe 23 is provided with a stop collar 29 that cooperates with metal washers 30 and 31 and a felt washer 32 which, when the nut 25 is screwed up tightly, will cooperate with the other group of washers to prevent leakage. The inner end of the pipe 23 is enlarged or weighted, so that notwithstanding the presence of the sealing washers, it will swing to the low point in the tank during any sidewise tilting of the tank.

I contemplate making the pipe 23 of what is frequently designated in the industry as "flexible metal hose," or where the character of the liquid employed will permit, I may make it of rubber or heavy fibrous material. By having the pipe flexible, its inner leg will swing to approximately axial alignment with the tank 3, when the tank is in vertical position with its discharge end uppermost, and therefore, the liquid can be effectively discharged even when the tank is in such upright position. When so made, however, the partition wall 6 will be placed a distance from the forward end wall 4 of the tank approximately equal to the length of the inner leg of the pipe 23.

I claim as my invention:

1. A fire extinguisher comprising a tank, a partition in said tank arranged to provide an air chamber and a chamber for fire-extinguishing fluid, a passageway through said partition, a check valve in said passageway, opening in a direction toward the said fluid chamber, a valve-controlled air inlet extending through an end wall of the tank and into the air chamber, and a filling pipe extending through said end wall and through the partition, for filling the said fluid chamber, the fluid chamber being provided with a discharge outlet.

2. A fire extinguisher comprising a tank having an inwardly-dished end wall, a partition in said tank arranged to provide an air chamber and a chamber for fire extinguishing fluid, a passageway through said partition, a check valve in said passageway opening in a direction toward the said fluid chamber, a valve-controlled air inlet extending through said end wall and into the air chamber, and a filling pipe extending through said end wall and through the partition, for filling the said fluid chamber, the fluid chamber being provided with a discharge outlet.

3. A fire extinguisher comprising a tank having a chamber for compressed air and a chamber for fire-extinguishing fluid, means affording communication between said chambers upon predetermined reduction of pressure in the fluid chamber relative to the pressure in the air chamber, a discharge pipe having one leg extending through a wall of the fluid chamber and having free rotative movement therein, the other leg of the pipe being within the fluid chamber and being flexible and of a length approximately equal to the radius of the fluid chamber, and the length of the chamber being not substantially greater than the radius thereof.

4. A fire extinguisher comprising a chamber for receiving fire-extinguishing fluid and compressed air, and provided with an opening centrally through one wall thereof, and a discharge pipe extending through said opening and having free rotative movement therein, the inner portion of the pipe being flexible and approximately equal in length to the radius of the chamber, and the dimension of the chamber axially of said opening being not substantially greater than said radius, whereby the inner end of the pipe will move to various points adjacent to the side wall and the end walls of the chamber upon changes in position of the chamber.

PERCY P. EAGLE.